United States Patent [19]

Yorkgitis et al.

[11] Patent Number: 4,868,006

[45] Date of Patent: Sep. 19, 1989

[54] POLYMERIC FILM WITH REDUCED SURFACE FRICTION

[75] Inventors: Elaine M. Yorkgitis; Samuel Smith; Andrew J. Ouderkirk; Douglas S. Dunn, all of St. Paul, Minn.

[73] Assignee: Minnesota Mining and Manufacturing Company, St. Paul, Minn.

[21] Appl. No.: 186,814

[22] Filed: Apr. 27, 1988

Related U.S. Application Data

[63] Continuation-in-part of Ser. No. 25,884, Mar. 16, 1987, abandoned.

[51] Int. Cl.$^4$ .............................................. B05D 3/06
[52] U.S. Cl. .................................. 427/53.1; 427/54.1; 427/55; 427/340
[58] Field of Search ................... 427/54.1, 55, 53.1, 427/340

[56] References Cited

U.S. PATENT DOCUMENTS

| | | | |
|---|---|---|---|
| 2,876,187 | 3/1959 | Wolinski | 204/158 |
| 3,081,485 | 3/1963 | Steigerwald | 18/1 |
| 3,145,242 | 8/1964 | Bryan | 264/80 |
| 3,607,354 | 9/1971 | Krogh et al. | 117/47 |
| 3,914,521 | 10/1975 | Beatty et al. | 428/461 |
| 3,978,341 | 8/1976 | Hoell | 250/492 |
| 4,048,428 | 9/1977 | Baird et al. | 526/343 |
| 4,247,496 | 1/1981 | Kawakami et al. | 264/22 |
| 4,311,759 | 1/1982 | Glennon | 428/345 |
| 4,414,059 | 11/1983 | Blum et al. | 156/659.1 |
| 4,417,948 | 11/1983 | Mayne-Banton et al. | 156/643 |
| 4,482,204 | 11/1984 | Blyler et al. | 350/96.34 |
| 4,518,654 | 5/1985 | Eichbauer et al. | 428/331 |
| 4,568,632 | 2/1986 | Blum et al. | 430/322 |
| 4,631,155 | 12/1986 | Caines | 264/22 |
| 4,710,563 | 12/1987 | Oetting | 528/501 |

FOREIGN PATENT DOCUMENTS

| | | |
|---|---|---|
| 33792 | 3/1980 | Japan. |
| 82380 | 4/1984 | Japan. |
| 101937 | 5/1984 | Japan. |
| 101938 | 5/1984 | Japan. |
| 760611 | 11/1956 | United Kingdom. |
| 1117354 | 6/1968 | United Kingdom. |
| 1149812 | 4/1969 | United Kingdom. |
| 1579002 | 11/1980 | United Kingdom. |

OTHER PUBLICATIONS

Journal of American Chemical Society, 104, 6784–6785 (1982), Srinivasan & Leigh.
Bishop & Dyer, Applied Physics Letters, 47, pp. 1229–1231 (1985) Dec. 1.
Srinivasan & Lazare, Polymer, vol. 26, pp. 1297–1300 (Aug. 1985) Conference Issue.
Srinivasan, Journal of the Vacuum Society, B1, pp. 923–926 (Oct. 1983).
Day and Wiles, Journal of Applied Polymer Science, vol. 16, pp. 175–215 (1972).
Blais, Day and Wiles, Journal of Applied Polymer Science, vol. 17, pp. 1895–1907 (1973).
Mimura et al., Japanese Journal of Applied Physics, vol. 17, pp. 541–550 (Mar. 1978).
Lazare and Srinivasan, Journal Physical Chemistry, 90, pp. 2124–2131 (1986).
Kawamura et al., Applied Physics Letters, 40, pp. 374–375 (March 1, 1982), published by Marcel Dekker, Inc., N.Y. and Basel, Chapter 5, p. 206.
Souheng Wu, Polymer Interface and Adhesion, published by Marcel Dekker, Inc., New York and Basel, Chapter 5, p. 206.

Primary Examiner—Norman Morgenstern
Assistant Examiner—Marianne L. Padgett
Attorney, Agent, or Firm—Donald M. Sell; Walter N. Kirn; Mark A. Litman

[57] ABSTRACT

Semicrystalline polymers can have predetermined amounts of their surfaces rendered amorphous or quasi-amorphous by irradiation. Further treatment of these polymer surfaces which have been so modified, such as crystallization, can produce surfaces with reduced coefficients of friction.

11 Claims, No Drawings

POLYMERIC FILM WITH REDUCED SURFACE FRICTION

This application is a continuation-in-part of application Ser. No. 07/025,884 filed Mar. 16, 1987, now abandoned.

BACKGROUND OF THE INVENTION

1. Field of Art

The present invention relates to semicrystalline polymers and particularly to semicrystalline polymers such as biaxially oriented polyester film whose surface has been treated to reduce its static and kinetic coefficients of friction.

2. Background of the Art

A problem that has often occurred in the handling, manipulating or processing of polymeric material is the relatively large coefficient of friction that exists between film surfaces. Biaxially oriented poly(ethyleneterephthalate) is a film material that is used extensively in commerce and manufacturing and is well recognized as presenting a problem with respect to an excessive coefficient of friction between adjacent sheets or plies. In many uses, such as in the handling and processing of imageable materials with poly(ethylene terephthalate) (PET) substrates, it is not desirable to use lubricants (either dry or wet) between the films. The drag between adjacent films can cause problems of multiple feeding of sheets, partial feeding of sheets, and skewing of sheets during automatic or even manual processing.

The problem is most readily manifest in the winding of PET film which contains neither so-called internal slip agents nor lubricating additives. The self-adhesion of adjacent plies is such that great force is required to separate those plies in an unwinding operation, and that force is frequently sufficient, particularly in the case of thin gauge films, to cause an unacceptable number of film breaks. Moreover, it has been established that to avoid troublesome film handling and processing the static and sliding coefficients of friction would be desirably less than 0.8, preferably less than 0.6.

One standard solution to this problem of the coefficient of friction is to incorporate particles in the film, using so-called internal slip agents. The presence of these particles (usually in the range of 0.1 to 3% by weight of the polymer), roughens the film surface and reduces the static coefficient of friction into the range of about 0.3 to 0.5. Although this technique has been used for many years, there are significant drawbacks to this practice. Not only are film costs increased by this procedure, but reduced film transparency which results from light scattering effects, and the increased roughness caused by multiple protrusions of the particulates in the surface of the film are frequently detrimental.

The effects of actinic radiation on the degradation of polymer surfaces have been studied for many years. Prior to about 1970, this work was done with low intensity photolamps at wavelengths greater than 220 nanometers (nm). Numerous papers are available in the literature, typical of which are Day and Wiles, *Journal of Applied Polymer Science*, 16, 175 (1972), and Blais, Day and Wiles, *Journal of Applied Polymer Science*, 17 p. 1895 (1973).

Between 1970 and 1980 the effects on polymer surfaces of ultra-violet (UV) lamps with wavelengths less than 220 nm were studied for lithography and surface modification purposes. Such studies are exemplified by Mimura et al., *Japanese Journal of Applied Physics*, 17, 541 (1978). This work illustrates that long exposure times and high energies are required to cause photoetching when UV lamps are used. U.S. Pat. No. 3,978,341 (Hoell) teaches an apparatus for exposing polymeric contact lenses to a spark discharge producing 83 nm to 133.5 nm UV radiation to improve the wettability and adhesiveness of the lenses.

In 1975 the excimer laser was discovered. An excimer laser is an excited dimer laser where two normally non-reactive gases (for example Krypton, Kr, and Fluorine, $F_2$) are exposed to an electrical discharge. One of the gases (Kr) is energized into an excited state (Kr*) in which it can combine with the other gas ($F_2$) to form an excited compound (KrF*). This compound gives off a photon and drops to an unexcited state which, being unstable, immediately disassociates to the original gases (Kr and $F_2$), and the process is repeated. The released photons are the laser output. The uniqueness of the excimer laser lies in its high efficiency in producing short wavelength (UV) light and its short pulse widths. These attributes make the excimer laser useful for industrial applications. Kawamura et al., *Applied Physics Letters*, 40 374 (1982) reported the use of a KrF excimer laser at 248 nm wavelength to photo-etch polymethyl methacrylate (PMMA), a polymer used in preparing photolithography resists for semiconductor fabrication.

U.S. Pat. No. 4,414,059 (Blum, Brown and Srinivasan) disclosed a technique for the manufacture of microelectronic devices utilizing ablative photodecomposition of lithography resist amorphous polymers at wavelengths less than 220 nm and power densities sufficient to cause polymer chain fragmentation and immediate escape of the fragmented portions. The photodecomposition leaves an etched surface. The authors found that using an ArF excimer laser at 193 nm with a 12 nanosecond pulse width, a threshold for ablatively photo decomposing poly(methylmethacrylate) resist material occurs at a fluence of 10–12 $mJ/cm^2/pulse$. It is stated that large amounts of energy, greater than the threshold amount, must be applied before ablation will occur. The energy used must be (1) sufficiently great and (2) applied in a very short amount of time to produce ablative photodecomposition.

U.S. Pat. No. 4,417,948 (Mayne-Banton and Srinivasan) and a related publication, Srinivasan and Leigh, *Journal American Chemical Society*, 104, 6784 (1982) teach a method of UV photo etching poly(ethylene terephthalate) (PET). In these publications the authors indicate the mechanism of photo etching to be one of chain scission or bond breaking of surface polymer molecules by the high energy UV. Bond breaking continues in the presence of irradiation and the smaller units continue to absorb radiation and break into still smaller units until the end products vaporize and carry away any excess photon energy. This process results in small molecules being ablated away, and various gases being evolved. The remaining surface material comprises molecular mixtures of molecules of low molecular weight (e.g., oligomers). Examining the PET repeating unit and the author's claim of bond scission, it is believed that the following occurs:

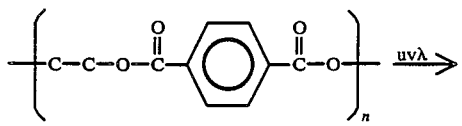

CO, CO$_2$, plus mixture of simple organic compounds and low molecular weight oligomers Indeed, in the *Journal of the American Chemical Society* article, the authors analyze for benzene and start detecting it at about 20 mJ/cm$^2$/pulse at 193 nm. The authors also indicate that the photo etch process is accelerated in the presence of oxygen which seals the ends of the broken chain's fragments and prevents recombination of these fragments.

Srinivasan, *Journal of the Vacuum Society,* B1, 923 (1983) reports the results of ablative photodecomposition of organic polymers through a 0.048 cm diameter mask and states that a threshold exists for the onset of ablation and, for PMMA, that the threshold is 10 mJ/cm$^2$/pulse. He then goes on to state that one pulse at 16 mJ/cm$^2$/pulse gave an etch mark on PMMA while 50 pulses at 4 mJ/cm:/pulse left no detectable etch marks. For PET and polyimide, the threshold for ablation began at about 30 mJ/cm$^2$/pulse. However, for a satisfactor 100 to 350 mJ/cm$^2$/pulse.

In Srinivasan and Lazare, *Polymer,* 26, 1297 (1985) Conference Issue, the authors report the photo etching of 6×12 mm samples of PET, PMMA and polyimide polymers with both continuous radiation at 185 nm from UV lamps and pulsed radiation at 193 nm from an excimer laser. The use of continuous low energy UV lamps caused photo oxidation of the polymer surface with a resultant increased oxygen-to-carbon ratio (O/C. ratio) as determined by x-ray photoelectron spectroscopy (XPS) equipment, while the use of a pulsed high energy excimer laser, which produces chain scission in and ablation of the polymer surface, resulted in a lower O/C. ratio as determined by XPS. The authors then go on to say "It may be pointed out that ablative photo decomposition is not exactly a method for the modification of a polymer surface at an atomic level since it totally eliminates the atoms at the surface and creates a fresh surface."

U.S. Pat. No. 3,607,354 discloses the use of highly active hydroxybenzene solvents to deluster the surface of an oriented polyethylene terephthalate film. The solvent acts to dissolve and swell the poly(ethylene terephthalate) and remains in the surface layer. The chemical composition of the surface layer is different from that of the bulk polymer because of the presence of the very active solvents at the time that the film is coated. The delustering may in fact indicate that crystalline spherulites of such a large size are produced that they scatter light.

U.S. Pat. No. 4,568,632 (Blum, Holloway and Srinivasan) claims a method for photo etching polyimides. The process described uses a pulsed excimer laser at 193 nm. The stated incident energy required for photo ablation is much higher for polyimide than for PET. The values for the laser fluence threshold of PET was reported as about 30 mJ/cm$^2$/pulse while for polyimide it was reported as about 50 mJ/cm$^2$/pulse. An operative level was noted as about 50-100 mJ/cm$^2$/pulse for PET and 100-300 mJ/cm$^2$/pulse for polyimide. The etch rate found for PET was 1000 Angstroms/per pulse for a fluence of 100-300 mJ/cm$^2$/pulse and for the polyimide was 750 Angstroms for 350 mJ/cm$^2$/pulse.

Lazare and Srinivasan, *Journal Physical Chemistry,* 90, 2124 (1986) report on the study of surface properties of PET which have been modified by either pulsed UV laser radiation or continuous UV lamp radiation. The authors report on the high fluence ablation of PET by pulsed excimer laser radiation as follows: (1) the PET irradiated surface is a layer of low molecular weight material, (2) the surface has a rough, chemically homogeneous texture, (3) the surface has a high chemical functionality characteristic of oligomers, and (4) the surface could be removed by washing in acetone. Since extremely low molecular weight fragments (oligomers) of PET are soluble in acetone, the authors assert this removal of the treated surface is indicative of the presence of low molecular weight material on the surface. The authors also report that the low intensity UV lamp treated PET surfaces would not wash off with acetone. This later article reports thresholds for ablation of PET at about 30-40 mJ/cm$^2$/pulse.

Japanese Patent Publications JA 59-82380, JA 59-101937 and JA 59-101938 (Kitamura, Veno and Nomura) describe the treatment of various polymers with many pulses from moderately high energy lasers for the purpose of increasing adhesion and forming a barrier layer to prevent plasticizer migration from within certain polymers Bishop and Dyer, *Applied Physics Letters,* 47, 1229 (1985) extended the photoablation etching work of others to actually cutting through or slitting the polymer film by increasing the energy density of the laser beam by appropriate focusing techniques.

The authors of the above references were studying the photodecomposition or photoablation process of UV radiation on polymer surfaces, without regard to whether the polymer was semi-crystalline or amorphous. The present invention does not produce substantial photodecomposition and little or no photoablation, and is concerned only with the pulsed UV radiation of semicrystalline polymers using exposure intensities in an energy regime different from those used in the prior art.

"Polymer Interface and Adhesion", Souheng Wu, Published by Marcel Dekker, Inc., N.Y. and Basel, Chapter 5, page 206 indicates that when a polymer melt cools and solidifies, an amorphous surface is usually formed, although its bulk phase may be semicrystalline. This is at least in part a result of fractions not accommodated in the crystalline structure being rejected to the surface. This amorphous surface is not recrystallizable because of the presence of the fractions and is believed to be extremely thin, corresponding to only a few layers of molecules, and is of the order of no more than 2 or 3 nm, and is generally less than 2 nm in thickness.

U.K Pat. No. 1,579,002 discloses vacuum glow discharge treatment of polymeric surfaces to increase adhesion to that surface. The glow discharge (i.e., corona type discharge) in the vacuum reduces the yellowing typically resulting from corona discharge treatment by 75 to 80%. The surfaces are heated to a temperature below the glass transition temperature or melting point during glow discharge treatment.

U.S. Pat. No. 3,081,485 describes a process for heating and softening polymeric materials using electron-beam irradiation so that further mechanical treatment such as stretching and coating can be carried out. The energy densities used (e.g., column 2, line 15) are about two orders of magnitude higher than the energy densities used in the present invention. The energy levels described in U.S. 3,081,485 would cause ablation. The authors note on column 2, lines 26 ff. that small traces of irradiated material are evaporated during irradiation. Although the patent describes surface heating, the immediate depth of e-beam penetration (see column 3) appears to be greater than 150 microns. This form of energy would have equal effects on the bulk polymer and would not cause only surface modifications.

U.S. Pat. No. 4,631,155 describes the surface modification of polymers by subjecting the surface to at least one pulse of intense electromagnetic radiation. The surface polymer is disoriented during the relatively long exposure to radiation. Disorientation is indicative of an amorphous surface. Very thick amorphous layers appear to be formed as indicated by the chloroform test described in column 5.

SUMMARY OF THE INVENTION

Semicrystalline polymeric material having a surface layer of the semicrystalline polymer in an amorphous, quasi-amorphous, or amorphous-ablated state is subjected to a treatment of a liquid or gaseous penetrant (e.g., solvent) or swelling agent which either enables crystallization to occur within that amorphous surface layer, dissolves amorphous or quasi-amorphous material to expose underlying crystalline polymer, or both.

DETAILED DESCRIPTION OF THE INVENTION

A semicrystalline polymeric material is treated, as by disclosed methods, to generate a layer of amorphous, quasi-amorphous, or ablated polymer on a surface of that material. The treated surface is then exposed to a material which is able to either (1) lower the Tg of the surface polymer layer so that crystallization occurs within that layer, or (2) dissolve the quasi-amorphous surface to expose underlying semicrystalline polymer. By controlling the size (thickness) of the irradiation generated layer, crystallite growth, when it occurs, is controlled so that the optically undesirable effects of large spherulites are not generated. The crystalline state on that surface layer also reduces the static and kinetic coefficient friction of that surface as compared to a normal surface of that polymer.

The surfaces useful in the practice of the present invention all include quasi-amorphous regions. In a preferred embodiment this region begins at the surface and comprises the entire top surface or region (if discontinuous). In other useful embodiments the quasi-amorphous region may lie immediately below or be part of a highly textured or chemically modified structure as would be produced according to the ablative procedure disclosed in U.S. Pat. No. 4,417,948, "Modification of Polymer Surfaces by Farultraviolet Radiation of Low and High (Laser) Intensities", R. Srinivasan and S. Lazare, *Polymer*, 1985, Vol. 26, Aug pp. 1297–1300; and "Ablative Photodecomposition", R. Srinivasan and W. J. Leigh, *J. Am. Chem Soc.*, 1982, 104 6784–6785. The useful surfaces according to these references can widely vary in their surface characteristics. These surfaces will contain zones or regions of quasi-amorphous polymer under polymeric decomposition debris and/or ablated surface areas. All products of this ablation technique will have significant, measurable amounts of polymer decomposition debris on the surface, in concentrations greater than present in the bulk polymer. This debris may be in the form of carboxyl groups, hydroxyl groups, lower molecular weight polymers or components, and the like. The polymers subjected to a rigorous ablative process as preferred by these references will have a surface with significant microstructuring thereon having average polymer molecular weights the same or less than that of the polymer in the bulk regions, and the surface exhibiting a lower oxygen/carbon ratio than the bulk material. The periodicity between peaks typically averages between 300 and 4000 nm and the average height (from valley to peak) of the microtexturing features is usually between 200 and 4000 nm. These materials, as well as the preferred structures being substantially free of polymer decomposition debris having quasi-amorphous areas which begin at the surface, are included within the description of a layer having a quasi-amorphous area of at least 5 nm in depth.

The residual debris denoted above would be organic material having a lower oxygen/carbon ration than the bulk polymer. Even if not visually observable in the amounts present, the debris itself would be yellower in color than the bulk material and would be more highly conjugated. The debris also tends to leave microscopically observable (at least 10,000, and even at 20,000×) artifacts on the surface recognizable as debris and not merely texturing. With respect to polyethylene terephthalate, ablation produces a surface substantially soluble in acetone, while the preferred quasi-amorphous surface layer is not soluble in acetone.

The essence of the preferred crystallization process is to first provide a film of a semicrystalline polymer having at least one surface layer comprising an amorphous, quasi-amorphous, or ablated layer of the polymer. The surface containing amorphous polymer is then exposed to a material (e.g., penetrant, solvent, swelling agent, etc.) which lowers the Tg of the quasi-amorphous or amorphous polymer containing layer to less than the ambient temperature (bulk temperature) of the polymeric material. As the Tg-lowering material removes itself (evaporation) or is removed (leaching) from the surface layer, crystallization of the polymer occurs in the layer. The size of the crystallites in this layer is controlled by keeping the initial layer thickness to less than 1,000 nm. The texture and morphology of the crystalline surface, which is formed during this process cause a reduction in the coefficient of friction at the surface of the polymer. By restricting the size of surface features to a range of less than 500 nm, and particularly to less than 400 nm, optical effects such as light scattering, haze, and blurring are also reduced or eliminated. In normal circumstances, solvent induced crystallization in an amorphous polymer causes the growth of spherulites of dimensions sufficient to scatter visible light. This is not the case in the present invention. Also, when crystallization occurs in the process of the present invention it is not accompanied by visually observable (i.e., 100×) changes in the surface texture.

The essence of the dissolution process is to remove some or all of the quasi-amorphous material to expose underlying semicrystalline polymer.

The polymeric article produced by penetrant treatment comprises a semicrystalline polymer having on at least one surface thereof areas having thicknesses of at least 5 nm and less than 500 nm of the same polymer in a crystalline distribution different from that of the bulk polymer, providing a kinetic coefficient of friction less than 0.8.

The use of a polymeric film having only a limited depth of amorphous, quasi-amorphous or ablated polymer is critical to the retention of optical clarity in the film. If a completely amorphous crystallizable polymeric material were subject to the process of the present invention, large spherulites would form, clouding the surface of the film.

There are other benefits to the use of the unique quasi-amorphous materials and processes of the present invention as compared to other known treatments for reducing surface roughness. Besides maintaining the clarity of the film, the process can be used on fully oriented films, and the treatment does not cause lower molecular weight materials to move to the surface, altering the properties of the bulk polymer and the surface.

The kinetic and static coefficients of friction provided to the surface can be less than 0.8, preferably less than 0.7, more preferably less than 0.6 and usually in the range of 0.40 to 0.6 or even less.

The present invention preferably provides a unique amorphized surface layer on a semicrystalline polymer, formed by the irradiation of the polymer by radiation which is strongly absorbed by the polymer and of sufficient intensity and fluence to cause such amorphized layer. The morphology of the semicrystalline polymer surface is thus altered into a new state of matter by radiation such as provided by an intense short pulse UV excimer laser or short pulse duration, high intensity UV flashlamp. This unique layer is referred to as a quasi-amorphous material for reasons later described. The quasi-amorphous layer is preferred in the practice of the present invention, but amorphous surfaces resulting from ablation (as by U.S. Pat. Nos. 4,568,632 and 4,417,948) or flame treatment may also be used to some advantage.

Polymers generally can be either semicrystalline or amorphous. These categories are descriptions of the degree of ordering of the polymer molecules. Amorphous polymers consist of randomly ordered tangled chains. That is, truly amorphous polymers are highly disordered and are independently surrounding and intertwined with other molecules. Semicrystalline polymers consist of a mixture of amorphous regions and crystalline regions. The crystalline regions are more ordered and segments of the chains actually pack in crystalline lattices. Unoriented amorphous polymers are those in which the polymer chains, or segments thereof recur in a "random tangle", I. M. Ward, *Mechanical Properties of Solid Polymers*, 2nd Edition, p. 8, John Wiley, N.Y., 1983. They show no regular distance by X-ray diffraction analysis nor any melting behavior, i.e., a first-order thermodynamic transition. Amorphous polymers may be oriented to various degrees by stretching in either one or more directions. In the oriented state the polymer chains have one or more preferred alignment directions. In the semicrystalline state, on the other hand, polymer chains, or segments thereof, pack into highly ordered 3-dimensional states having characteristic repeat distances which may be measured by X-ray diffraction patterns. Moreover, they show a first-order transition, i.e., true melting behavior. Semicrystalline polymers are those in which portions or segments of their chains are in an amorphous state while other portions are packed into chain-folded crystalline lattices. If crystalline regions are heated in normal fashion above the melting temperature of the polymer, those regions are rendered amorphous. If cooled rapidly, this less ordered feature is "frozen" in place and the resulting polymer is said to be amorphous. If cooled slowly, these segments of these chains can repack to form crystalline regions and the polymer is said to be semicrystalline. Some polymers are always amorphous. Other polymers having a regular chemical structure can be made semicrystalline by heat treatments, stretching or orienting and by solvent inducement, and the degree of crystallinity can be controlled to some degree by these processes.

In understanding the present invention, a number of terms and concepts should be appreciated. The preferred radiation treatment of the surface of semicrystalline polymeric materials according to the present invention does not add or substantially remove material from the surface. Residual solvent or residual low molecular weight reactants and additives may be volatilized during this treatment, but there is less than 0.5% and preferably 0.1% degradation (to a volatile state) and/or volatilization of the bulk of polymeric material having a molecular weight in excess of 10,000 within the bulk of the radiation affected polymer. The chemical modification of the polymer surface (e.g., oxidation, chain breakage) is minimal if there is any at all. Only a small amount of chain breakage occurs, without the generation of significant amounts (i.e., greater than 0.1% by bulk weight of the radiation melted polyer) of materials volatilized during the process.

The terms amorphous, crystalline, semicrystalline, and orientation are commonly used in the description of polymeric materials. The true amorphous state is considered to be a randomly tangled mass of polymer chains. The X-ray diffraction pattern of an amorphous polymer is a diffuse halo indicative of no regularity of the polymer structure. Amorphous polymers show softening behavior at the glass transition temperature, but no true melt or first order transition.

The semicrystalline state of polymers is one in which long segments of the polymer chains appear in both amorphous and crystalline states or phases. The crystalline phase comprises multiple lattices in which the polymer chain assumes a chain-folded confirmation in which there is a highly ordered registry in adjacent folds of the various chemical moieties of which the chain is constructed. The packing arrangement (short range orientation) within the lattice is highly regular in both its chemical and geometric aspects. Semicrystalline polymers show characteristic melting points, above which the crystalline lattices become disordered and rapidly lose their identity. The X-ray diffraction pattern of semicrystalline polymers (or copolymers) generally is distinguished by either concentric rings or a symmetrical array of spots, which are indicative of the nature of the crystalline order.

Orientation of the polymer is the directional alignment of the polymer chain (long-range order) or segments of the polymer (chain) within the polymer composition. In the quasi-amorphous state described in the practice of the present invention, it appears that the overall long-range order orientation or ordering of the crystal lattice remains in an apparent crystalline orientation. It also appears that there is, however, significant localized disordering along the chain (short-range order orientation). The quasi-amorphous form thus exhibits short-range disordering typical of amorphous phases while it exhibits long-range ordering typical of crystalline structures. These characteristics are observable and determinable by single analytic techniques or combinations of techniques such as X-ray diffractions, spectromicrophotometry, IRRAS (infrared reflectance/absorbance spectrophotometry), NMR, solvent extraction, and the like.

The surface of the semicrystalline polymer is converted into its quasi-amorphous form by heating and rapid cooling of a determined amount of that surface. A determinable depth of the polymer composition is converted to the quasi-amorphous state. The conversion is referred to as "amorphizing." The thickness of the amorphized polymer, as measured from the surface downward into the bulk of the polymer, can be controlled. The polymer usually has a quasi-amorphous top surface having a depth of at least 5 nm, preferably at least 10 nm, more preferably at least 40 nm and most preferably at least 60 nm. The range of thickness for the quasi-amorphous phase or surface of the polymer may be from about 5 to 500 nm, preferably 10 to 500 nm, more preferably 20 to 500 nm or 20 to 100 nm and most preferably 20 to 250 nm, depending upon the ultimate use of the article.

The surface amorphous layer is firmly adhered to the bulk of the semicrystalline polymer because of the in situ nature of the conversion. There can even be a discernible gradation zone between the amorphous and semi-crystalline areas, although this is not always the case. That is, the transition can be very abrupt within the polymer.

Using patterned or imagewise distributed radiation, the portion of the surface area which is amorphized may be as small as 1% with some beneficial effects being noted. Generally it is at least 3%, and preferably 5 to 100% of the surface. More preferably at least 10% or 30 to 100% of the surface is amorphous. These are percentages by surface area.

In performing the process of making the quasi-amorphous surfaces of the present invention, the wavelength of the light or ultraviolet radiation and/or the polymer and/or absorbing dye in the polymer should be chosen so that the polymer composition exhibits an extinction coefficient greater than about 5,000. The polymer composition should exhibit an alternative description of an absorptivity coefficient greater than about 1/micrometer or 5/micrometer. The higher the extinction coefficient for any given wave-length, the thinner is the surface layer which resides in the optical path of the radiation, and correspondingly, the thinner is the surface layer which undergoes a morphological transition or "amorphization". The wavelength range of preferred interest is between about 180 and 260 nm, with the highest extinction coefficient being manifested at the shorter wavelengths. Preferably a coefficient of extinction of at least 10,000 is exhibited by the polymer at the wave-length of irradiation.

When utilizing ultraviolet radiation (e.g., 193 nm for a biaxially oriented poly(ethylene terephthalate) film), it is desired that the film receives energy corresponding to a fluence of 3-25 mJ/cm$^2$/pulse. At fluences of less than 3 mJ/cm$^2$/pulse, the effect of the radiation is not readily discerned. At fluences greater than 25 mJ/cm$^2$/pulse, one begins to encounter excessive damage to the affected surface layer, such as vaporization (e.g., off-gassing) of low molecular weight products of photodegradation, substantial reduction of the molecular weight of the surface layer, and more extensive surface roughening and discoloring.

The radiation pulse duration, i.e., the pulse width, should be in the range of 10 nanoseconds to 100 microseconds to assure rapid excitation of the affected surface layer.

The net effects of pulse width, coefficient of extinction, and radiation intensity are to produce a particular mechanistic event. First, and to a minor degree, there is a photolytic effect in which absorbed radiation energy causes random bond scission to occur in the semicrystalline polymer. This effect is desirably minimized in the practice of the present invention to minimize the damage to polymer properties caused by this effect. Indeed, operation of the present invention under ideal conditions has been found to cause some decrease in the oxygen-to-carbon ratio, but sensitive ellipsometric and gravimetric measurements have been unable to detect any significant loss of material as a result of proper radiation conditions The quasi-amorphous surface layer may undergo some controlled degradation with as much as a 50% reduction in number average molecular weight.

The second effect is a result of the unusual nature of the thermal excitation of the surface layer in the optical path of the radiation. Much of the absorbed light energy is translated into heat, with the heating cycle corresponding to the pulse width of the radiation. It is certain that instantaneous temperatures that far exceed the normal melting point of the polymer (e.g., for poly(ethylene terephthalate) that is about 260° C.) are reached throughout most of the affected volume, although an unusual thermal gradient may be produced in that volume because of the rapid attenuation of the incident energy due to light extinction by the polymer composition. The heat cycle thus corresponds to the pulse width, in a range of from about 10 nanoseconds to 100 microseconds. After the heating cycle, the next phenomenologic concern is the ensuing cooling cycle. Because of the thin nature of the affected volume and its contact with ambient air at the surface and bulk material (which are usually at room temperature), it can be estimated that the surface probably cools down to the glass transition temperature (e.g., for poly(ethylene terephthalate) this is about 75° C.) within microseconds. Once below this temperature, polymer chain confirmations tend to be frozen. Considerations with respect to this unusually brief thermal cycle indicate that conformational changes available to the polymer chains remain highly restricted during the brief period while the affected surface area undergoes this excitation. Short segmental motions, e.g., of the 'crankshaft' rotational type, have extremely short relaxation times, and it is expected that they may readily occur within the time-temperature regime created in the practice of the process of the present invention. The confirmation that such motions do indeed occur is provided by the IRRAS spectroscopic studies that show that there is a significant trans-to-gauche-conformer transformation in the surface layer which results from the irradiation of semicrystalline film (e.g., biaxially oriented poly(ethylene terephthalate)) with an ArF excimer laser.

This type of conformational change requires the rotation of a short segment of the PET chain involving only a few carbon or oxygen atoms. Similar considerations indicate that it is highly unlikely that the pre-existing crystallites or crystal lattices in the affected surface layer undergo any major spatial rearrangements because this time-temperature regime precludes the type of long range translational and large chain segment rotational motions which would materially change the pre-existing packing arrangement within the crystal lattice. Thus, it strongly appears that the pulsed UV irradiation of PET (and probably all semicrystalline polymers having appropriate extinction coefficients) provides films having surface layers with a unique morphology (i.e., quasi-amorphous) in which the polymer chains are highly disordered over short segment lengths, but substantially retain the long-range order that existed between chains and very long segment lengths of those chains prior to excitation. Indeed, the excimer laser treatment of a thin film of thermally crystallized PET indicated that the original spherulitic structure remained intact, tending to affirm this description.

The substantial trans-to-gauche-conformer transformation is a clear indication of short range chain confirmation disordering, suggesting that although the crystallites may have undergone short range disordering, the longer range 3-dimensional packing order probably remains virtually intact. It is for this reason that the surface is referred to as quasi-amorphous since it has physical characteristics embodying some crystalline properties, and yet displays predominantly amorphous properties.

The volume of polymer, that is the affected polymer or polymer converted by the process of the present invention is defined as being in a 'quasi-amorphous' state because the highly ordered registry of identical chemical moieties in adjacent folds of the chain-folded crystal lattice is largely destroyed, but the overall 3-dimensional architecture of the crystal lattice is preserved. Thus, the chemical disordering which occurs as a result of the radiation is characteristic of an amorphous state, while the retention of longer range geometric order resembles a pseudo-crystalline state. The layers or regions are neither totally amorphous nor totally crystalline in the classic sense of those words. In this specification where quasi-amorphous layers or regions produced in the practice of the present invention are discussed, those regions may be referred to as quasi-amorphous layers or regions because their chemical properties tend to resemble amorphous compositions rather than crystalline compositions, but amorphous and quasi-amorphous are distinctly different as noted in the description of quasi-amorphous materials given above.

Quasi-amorphous is a state which is between semicrystalline and amorphous. It is more difficult to distinguish from a true amorphous state than a semicrystalline state, but a clear distinction can be drawn.

The quasi-amorphous layer must, of course, be formed from a semicrystalline state. The semicrystalline state may be a uniaxially oriented film, biaxially oriented film, or contain grossly unoriented crystallites (e.g., spherulitic crystallites randomly distributed throughout the film). When such a semicrystalline film is converted by the process of this invention (in whole or in part, as on one surface only) to the quasi-amorphous form, the quasi-amorphous areas will appear to be amorphous except that they will retain a latent memory for the crystallite orientation. This is a definitive distinction from the true amorphous state.

For example, oriented film will display anisotropy with respect to the absorption of infrared radiation (e.g. between 5,000 and 16,000 nm) in various directions in the film. Biaxially oriented film would most significantly display this anisotropy between the unoriented thickness dimension (e.g., the Z-axis) and the oriented length and width dimensions (e.g., the X- and Y-axes) of the film. When such an oriented film is quasi-amorphized according to the present invention to a state most closely resembling a true amorphous film (e.g., the entire thickness or a larger thickness is repeatedly treated without ablation of the film is quasi-amorphous), the film or layer will appear to be amorphous. However, the film or layer will not be truly amorphous because it will retain a latent memory for the crystallite orientation, in this case being evidenced by a latent memory for the anisotropic orientation of the original semicrystalline polymer When this quasi-amorphous layer or film is heated to promote recrystallization, the film or layer will begin to regain its original crystallite distribution or in the case of oriented film, regain at least part of its anisotropic orientation. When a truly amorphous layer is reheated, it will not develop anisotropy. Where the semicrystalline polymer film originally contained grossly unoriented crystallites, reheating of the quasi-amorphous layer or film would return such a crystallite orientation to the layer or film.

The process appears to work by the semicrystalline polymer's absorbing the energy of the irradiation within a limited depth of the irradiated surface. The energy is of sufficient intensity and duration to melt polymer, but of insufficient intensity and duration to evaporate, significantly chemically modify, or ablate polymer. When the irradiation stops, the melted polymer rapidly cools without recrystallization. No special cooling of the melted layer usually needs to be performed as the melted layer is usually sufficiently thin that ambient air and adjacent bulk polymer temperatures will cool it sufficiently rapidly. Forced cooling can be used on thicker layers if desired or can be used on thin layers to insure even more rapid cooling.

The semicrystalline polymer should be able to absorb the irradiation used in the process. The more highly absorptive the polymer is of the radiation, the greater the effect of the process on the surface of the polymer. In general, the polymer should be able to absorb sufficient energy to cause melting of the surface and yet not absorb radiation at such a high level as would cause ablation, excessive degradation, or volatilization of the polymer. Absorption of the radiation may be enhanced by the addition of radiation absorbing dyes and pigments to the polymer. These, and other, radiation abosrbing materials can have some noticeable effect at levels as low as 0.05% by weight, but can also be used at higher levels, even up to 50% by weight and higher. For example, a polymer used to modify a pigment may be treated after it has been combined with the pigment. A generally preferred range would be from 0.1 to 50% by weight for such radiation absorbing additives.

The quasi-amorphous surface layer on the semicrystalline polymer base is unique because (1) it exists without substantial change of the surface chemical structure while the bulk properties of the polymer are unchanged, (2) it has a lower softening temperature than the semicrystalline polymer, which lower softening temperature allows auto adhesion at a temperature below that at which the bulk film would autoadhere, (3) the controlled depth of amorphization serves to limit the depth of solvent penetration and hence limits the effect of solvents on the amorphous layer, and (4) it has a reduced optical index of refraction which is graded from the bulk to the surface.

The intermediate quasi-amorphous surface, semicrystalline polymer product of the present invention has characteristics and features which tend to be different from those of the products of prior art processes. For example, it has been noted that the depth of the quasi-amorphous areas is at least five (5) nanometers. This tends to be an inherent result of the process. The previously referenced work reported by Wu concerning amorphous surfaces generated by non-crystallizable fractions being forced to the surface produces very thin amorphous layers. The thickness of these layers is never more than 3 nm and is usually less than 2 nm. Additionally, the chemical make-up of the surface region is significantly different from that of the bulk polymer because of the concentration of non-crystallizable fractions at the surface. These fractions in fact prevent that surface from being recrystallizable. The surface produced by this prior art phenomenon would have a weight average molecular weight more than 50% less than the weight average molecular weight of the associated bulk semicrystalline polymer. The surface produced by the practice of the present invention would have a difference of less than 50% between the weight average molecular weight of the surface quasi-amorphous layer and the bulk semicrystalline polymer.

Another characteristic of the preferred intermediate treated materials of the present invention which sometimes can be observed but is unique to those articles of the present invention is the similarity between the molecular orientation of the surface quasi-amorphous layer and the semicrystalline polymer in bulk. Polymer orientation relates to the degree to which polymer chains are statistically or more predominantly oriented or aligned within the polymer. Ordinarily, when semicrystalline polymers are melted, the orientation in the crystalline and amorphous phase is randomized and is significantly different from the orientation of semicrystalline polymers. Observations of the amorphized surfaces in the practice of the present invention indicate that the orientation within the amorphous layer remains similar to that of the semicrystalline polymer. Microscopic examination under cross-polarizers shows that the orientation of the quasi-amorphous layer is similar to or indistinguishable by visual observation from the orientation of the semicrystalline polymer. The physical properties of the amorphous layer, such as its index of refraction, infrared absorption spectrum and solubility clearly show that the layer is in fact in an amorphous-like state.

Corona discharge treatment of polymer surfaces does not necessarily render surfaces amorphous, but oxidizes the surface of the polymer. Corona treatment tends to have its most significant oxidative effect to a depth of about 2 nm. The corona treatment creates or adds functional groups to the polymer as a result of reactions with the environment in which the discharging is performed. For example, functional groups such as carboxylic groups, phenol groups, hydroxyl groups, carboxyl groups, and amide groups can be added to the polymer by the corona treatment. These groups would not be a direct product of the process of the present invention. Corona treatment of the quasi-amorphous surfaces of the present invention would generate such functional groups and would not necessarily crystallize the surface. Corona treatment also changes the optical density of the surface layer because of the formation of these new chemical materials in that surface. As compared to the bulk polymer, the optical density of the surface layer may increase by 0.2 within a 50 nm region of the visible portion of the electromagnetic spectrum (particularly in the yellow region).

Both corona discharge and flame treatment significantly modify the chemical composition of the polymer in the surface regions treated. Corona discharge tends to change the chemistry of the polymer as to decompose or cross-link the polymer. The article of the present invention, unless further treated as by corona discharge, will have approximately the same crosslink density in the amorphous surface layer as in the bulk polymer region. This change in cross-link density can be observed in the surface layer by a reduced tendency or ability to recrystal)ize. Plasma, and ion implantation treatments have effects on the crosslink density similar to those generated by corona discharge.

Flame treatment of polymeric surfaces (such as that reported in U.S. Pat. No. 4,568,632) is a much more destructive and chemical composition altering process than the process of the present invention. The patent describes the ablation of materials from the surface during treatment. This is probably the combined result of evaporation, oxidation, polymer chain breakage, and other destructive processes. This process would cause the formation of the functional groups described above and probably cause a significant overall change in the molecular weight and chemical make-up of the polymer on the surface, probably to a depth of about 2 nm. The flame treatment as presently practiced also causes a change in the optical density of the polymer on the surface due to the change in the chemical composition of that surface layer. That change in optical density is at least about 0.2. In the practice of the present invention, the amorphous layer produced on the surface has an optical density which is within 0.1, preferably within 0.08, more preferably within 0.05 and most preferably within 0.03 units of the bulk polymer. Additional treatment (e.g., corona discharge or coloration with dyes or pigments) could, of course, be used to change that value. But in the absence of dyes or pigments differentially distributed between the quasi-amorphous layer and the bulk layer, there should be little or no difference in optical densities.

In the preferred fluence range of the intermediate product used in the present invention, the most notable result is the formation of a new morphological state of the polymer within the surface layer (i.e., a quasi-amorphous, deoriented or oriented glass) which resides in the optical path of the radiation and begins at the surface of the polymer. This morphological transition is attended by some extremely mild degradation, as attested by the diminution of the O/C ratio (XPS analysis and solvent extraction data). The failure to detect weight loss by gravimetric and ellipsometric measurements indicates that gas evolution is, at most, a minor event. Similarly, IRRAS spectra show evidence of only a conformational or morphological rather than any chemical change. The change in the O/C ratio is quite different from that occurring with flame treatment or corona discharge where the atom/atom, oxygen/carbon ratio increases. This increase may be very small, but in most thorough treatments there is a change in the ratio of about 0.1 or 0.2. The O/C ratio may actually decrease in the quasi-amorphous layer as compared to the bulk polymer.

Two major applications for which PET films are widely used are as substrates for photographic or imageable films and magnetic recording media. In the case of imageable films, it is often necessary to avoid completely the use of internal slip agents because they impart excessive haze to the film. In this instance, it is common practice to knurl a pattern which imparts a thick edge to the film which serves to separate the plies of film during winding and unwinding operations. The inclusion of air spaces facilitates the handling of such films. However, this knurling procedure is limited in use to relatively thick films, i.e., films having a final gauge in excess of about 50 micrometers.

In the case of thin films, e.g., magnetic video tapes which typically vary in thickness between 8-20 micrometers, there really has been no suitable alternative to the use of internal slip agents. In this instance the surface roughness that these slip particles impart to the film is objectionable because it becomes a limiting factor in the density of recorded information which may be stored per unit area of film. Moreover, the use of slip agents is objectionable because of the increased cost of film manufacture that their use entails and the shortened life of filters used to remove agglomerates from the PET melt prior to extrusion.

The present invention provides a novel form of a PET film which is unique in at least two respects. It can be provided in a biaxially oriented form in which the film is virtually haze-free, has unusually smooth surfaces and yet has a sufficiently low coefficient of friction to enable facile processing during its manufacture and subsequent use. It also has remarkably adherable characteristics in that useful functional coatings, such as pressure-sensitive adhesive coatings, magnetic coatings, imageable coatings, etc., may be directly applied thereto with outstanding adhesion being manifest without resort to any of the intervening adhesion-promoting chemical or physical treatments which are normally required.

The PET films of the present invention are made in a two-step process. First, the biaxially oriented PET, which preferably has been extensively crystallized during normal orientation and heat setting steps is subjected to pulsed UV radiation under conditions which effectively "amorphize" a thin surface layer of the film.

The second step involves the treatment of the amorphized surface layer with either a liquid or gaseous penetrant which is known to be effective in inducing the transformation of amorphous PET to a semicrystalline state. The nature of the morphological transformations which the PET film surface layer undergoes in each of these steps is more fully discussed later.

The second step of the inventive process entails the exposure of the affected surface layer to a penetrant which transforms normally amorphous areas of the polymer into semicrystalline polymer. This transformation is triggered by the swelling of the polymer by the penetrant to reduce its Tg below room temperature, thus allowing the chains sufficient mobility to crystallize. Many solvents and penetrants are known in the prior art which induce crystallization at 25° C. of normally amorphous poly(ethylene terephthalate). The mechanism for this crystallization as well as an extensive listing of useful materials is described in Polymer Symposia 46, 291, Interscience, 1974 by A. B. Desai and G. L. Wilkes.

It is known that crystallizable polymers, when amorphous, respond to thermal annealing above Tg to crystallize. Transmission electron micrographs at 32,000 magnification of replicated surfaces show that the texture of the essentially featureless surface of laser treated PET is converted to a texture suggesting a lamellar crystalline nature when annealed for 30 minutes at 210° C. IRRAS spectroscopy affirmed that crystallization had occurred because of the almost complete conversion of the short-range disordered gauche-conformer to the trans-state. (The thermally recrystallized film was found to be non-heat sealing.)

The effects of active penetrants on the amorphized surface layer have surprisingly been found to be quite disparate. Immersion of laser treated PET in either acetone, methylene chloride, or chloroform, followed by drying, effectively yields films having slippery surfaces, i.e., acceptably low coefficients of sliding friction. However, we have found that both methylene chloride and chloroform dissolve most, if not all, of the affected surface layers and replicated surfaces of these treated films show fairly nodular textures. Thus, these particular solvents essentially remove the affected surface layer and apparently reveal the largely unaffected underlying bulk polymer. Acetone treatment, on the other hand, was found to dissolve no measurable amount of material. Apparently, it simply caused the amorphized surface layer to recrystallize and micrographs of the thus-treated film at 32,000× showed a pronounced, fine, regularly reticulated texture.

A summary of the salient features of the various treatments and the film properties is given in tabular form.

| Treatment | Adherability of Coatings | Heat Sealability | Film Reflectance | Gauche Content | Texture | Coefficients of Friction |
|---|---|---|---|---|---|---|
| Laser | Fair | Excellent | Reduced | High | Featureless | High |
| Laser & 30 mins. @ 210° C. | Poor | Poor | High | Nil | Suggestive of lamellar crystallinity | High |
| Laser + CH2Cl2 | Good | Poor | High | Nil | Irregular nodular | Low |
| Laser + acetone | Excellent | Excellent | Reduced | Intermediate | Uniformly reticulated | Low |

All of these films are essentially haze-free when the irradiated film is free of external slip agents Thus, the penetant, preferably a liquid, that is useful in the practice of this invention is a substance which promotes the crystallization of ordinary amorphous PET and acts on pulsed UV radiated PET film either to dissolve and remove the affected amorphized surface layer or to induce its crystallization It is also possible that a combination of dissolution and induced crystallizaton usefully occurs.

The penetrants which are useful in the practice of the present invention include, but are not limited to, ketones, esters, cyclic ethers and chlorinated hydrocarbons in either liquid or vapor form. The use of liquid penetrants is highly preferred because its effectiveness in achieving desired results is almost instantaneous. Mixtures of the active penetrant either inter alia or with other inactive materials, i.e., substances which do not per se induce the crystallization of amorphous PET, are also useful in the practice of this invention. Useful active penetrants (more fully described in Polymer Symposia, A. B. Desai and G. L. Wilkes, supra) include acetone, methyl ethyl ketone, butyrolactone, ethyl acetate, propyl acetate, ethyl butyrate, tetrahydrofuran, dioxane, methylene chloride, chloroform, ethylene dichloride, dimethyl formamde, and chlorobenzene. Inactive materials which may be used in admixture with the active penetrants include water, ethyl alcohol, isopropyl alcohol, diethyl ether, benzene and toluene. It is important, however, that the concentration of inactive materials, when used, be limited so as not to ameliorate unduly the effect of the active penetrant.

The remarkable aspects of the intermediate quasi-amorphous surface layer in this invention are: (1) its unchanged texture; (2) its unchanged optical absorption or scattering characteristics, and (3) its still appreciable molecular weight Each of these aspects can be very important. For example, if film roughness were to be imparted, it is very injurious in substrates for magnetic media because that roughness can be the limiting factor in the ultimate density of recorded information that can be achieved. Film yellowing or scattering (i.e., haze) on the other hand cannot be tolerated where the film is used as a substrate in the manufacture of imaging products, e.g., X-ray film. Finally, the absence of a major fraction of low molecular weight oligomeric products avoids the situation where subsequently applied functional coatings fail in use due to inherently poor adhesion or solvent resistance which stems from an otherwise weak boundary layer present at the coating/film interface. Thus, the principal benefit of this invention appears to derive from the use of a semicrylstalline polymer, especially biaxially oriented poly(ethylene terephthatlate) films, which are free or essentially free of slip agents. It is preferred to expose the film on-line (i.e., in the film making process) with the pulsed irradiation and then the penetrant treatment given prior to winding the film into a roll. Slip agents may be used in the film, but they tend to reduce the achievable benefits of the present invention.

The amorphous surface of the polymer also reduces the reflectivity of that surface. Normal, smooth, uncoated polymer films will have a reflectivity of 10% or more. Highly texturized polymer surfaces can reduce this reflectivity, but cannot present a smooth surface, that is a surface having no texture which is easily visible with a scanning electron microscope at 10,000× magnification. The polymer films of the present invention can provide smooth surfaces with reflectivities of 9% or less to 550 nm light at 80°–90° incident angles. This is clearly shown in the Examples. Reflectivity values of less than 8% can be achieved when both sides of the film are irradiated.

The irradiation portion of the process of the present invention also tends to not modify the surface of the polymer in a topographic morphologic (geometric) sense. The surface structure, before and after amorphizing, tends to be the same in the practice of the present invention. Surfaces with a high degree of surface roughness may be somewhat softened in their features, but will still tend to have rough surfaces. Smooth surfaces will be substantially unchanged with respect to the absence of features on their surface. Flame treatment would tend to greatly modify the chemical structure of the surface so treated as a result of oxidation.

One aspect of the uniqueness of the present invention is the reversal of the above crystallization process to transform a thin surface layer of semicrystalline polymer into an amorphous thin surface layer residing on nonaffected bulk semicrystalline polymer.

There are necessary conditions required of the radiation source to provide the intermediate treatment of the present invention. High intensity (high power per unit area), short pulse widths, and high fluence (high energy density per pulse) are required of the radiation source. These requirements assure that a substantial amount of heat generated in the very thin surface of treatment stays in the surface. The effect of the radiation is to concentrate energy into the surface layer. Thermal diffusion into the bulk reduces this concentration of energy and makes the process less efficient. It is, therefore, desirable that only a small amount of heat be dissipated into the bulk of the polymer during irradiation. The more heat that is transferred to the bulk during the surface irradiation, the less efficient the process becomes until so much heat goes to the bulk that the process no longer works. Because of this requirement to rapidly heat only the surface layer and not the bulk of the polymer, conventional high intensity UV sources such as mercury arc lamps and common Xenon flash lamps with their inherently long pulse widths result in rapid diffusion of the thermal energy into the bulk polymer. This prevents a high concentration of energy being achieved at the surface.

The UV excimer laser is capable of producing short duration high intensity, high fluence radiation on the surface of the polymer to be treated. The polymer used with a UV excimer laser must be semicrystalline and UV absorbing at the UV laser wavelengths. The result of the laser pulse interacting with the surface is a combination of photolyzation and heating. In other words, the short intense pulse significantly heats the surface of the polymer, but not the bulk, above the polymer melting temperature, and some surface molecule chain scission occurs. During the brief time the surface region is heated above its melting temperature, the molecules can randomize and reorganize themselves into a disordered condition and broken bonds reconnect, although not necessarily to the same end from which they were broken or to the same degree. The temporarily broken molecular bonds will assist this melting process. After irradiation the surface layer will rapidly cool, and "freeze" the new disordered layer into an amorphous structure. That is, the cooling rate is fast enough so the surface layer cannot recrystallize. The irradiation thus produces an amorphous layer on the bulk polymer which layer undergoes only a small change in molecular weight because of the recombination of bond scissions and no chemical changes such as the addition of ions. The surface texture undergoes no significant change because no material has been removed or ablated and both melting and cooling occur over a short period of time.

The preferred laser treated intermediate product surface layer can be shown to be quasi-amorphous by a number of tests: (1) it washes off with solvents that only the amorphous form of the polymer is soluble in, (2) infrared reflection absorption spectroscopy (IRRAS) of the surface indicates the same pattern in the surface layer as is normally exhibited by the amorphous form of the polymer, and (3) thin film ellipsometry of the surface gives the same refractive index as does the amorphous form of the polymer.

XPS measurements of the treated surface indicates no significant chemical changes by addition. It also shows that a small O/C. ratio change has occurred which indicates some small amount of surface decarboxylation. Gel permeation chromotography (GPC) chloroform-extracted PET film shows only a small molecular weight decrease as compared to the untreated polymer. Water contact angle measurements show no change in the treated surface which means the surface has not been roughened significantly and that functionality groups have not been added. As viewed at 32,000× magnification, slight texturing on an extremely fine scale is observed, with no features greater than 700 Angstroms or 600 Angstroms in height, and most (more than 50%) of all features having a height of less than 300 Angstroms. Shadow mask Transmission Electron Microscopy (TEM) indicates peaks and valleys on the surface of about 300 Å. In still other cases, similar treated PET film displays completely smooth, essentially featureless surfaces.

Early investigations of laser treatments of polymers were concerned with etching or ablation of the polymer and thus used laser intensities and fluences much higher than required for the present invention. These investigators found a fluence threshold for ablation which of course was different for each polymer treated. Below this threshold no ablation would take place. Investigation was never made to determine what actually was occurring at lower fluences. It has been found that like the fluence threshold for ablation, there is likewise a fluence threshold for the amorphization of this invention and it too varies with the polymer being treated.

Because of its great commercial interest, the treatment of PET has been studied most extensively during the progress of the present invention. However, other polymers have also been studied. The following semicrystalline, UV absorbing polymers or copolymers thereof have been treated: polyesters (e.g., PET), nylon, coating mixtures of poly(vinylidene chloride) on PET and poly(vinyl chloride) with UV absorbing plasticizer added. Polypropylene, polyethylene (e.g., polyolefins), polyvinyl chloride, polytetrafluoroethylene and polyvinylidene chloride, although semicrystalline, are not UV absorbing at wavelengths greater than 190 nm, and therefore, require one of the following: the addition of UV absorbing compounds, shorter wavelength lasers, or an energy source different than a UV laser.

Polymethylmethacrylate and epoxies are normally amorphous and so treatment is unnecessary and does not effect a differentiation between the surface and bulk polymer.

The UV radiation source can be by excimer laser or flashlamps at wavelengths less than 320 nm. The pulse widths should be less than 100 microseconds. Typical pulse widths in the preferred practice of the invention are 7.5 microseconds for flash lamps and 10-80 nanoseconds for an excimer laser.

EXAMPLES

In the following examples all treatments were done using either a Model 2460 laser by Questek, Billerica, MA or a Model 102E laser by Lambda Physik of Acton, MA. These lasers give equivalent outputs for the purposes of treating polymer films. The lasers were operated with either Ar plus Fluorine gas at an emission wavelength of 193nm or with Krypton plus Fluorine gas at an emission wave length of 248 nm and with a system of cylindrical lenses to control the exposed area of the sample and thus the energy density of the beam striking the sample. Each system was calibrated using a Model ED500 power meter by Gentech, Ste-Fog, Qc, Canada. Pulse width was approximately 15 nanoseconds for both lasers.

EXAMPLE 1

This example describes the treatment of a surface of 0.1 mm (4 mil) thick biaxially oriented polyethyleneterephthalate (PET) film with no slip agents added. This film is available as product #OR8478400 obtainable from 3M, St. Paul, MN. After laser exposure each sample was measured for change in optical transmission at 550nm using a Lambda 9 Spectrophotometer from Perkin Elmer (Norwalk, CT) with a 10 second response time. Untreated film was used as a control and measured 88.25% optical transmission. The following data shows the change in % transmission from this control value.

Table 1 shows the results and indicates an increase in optical transmission for PET films treated on one side at 193 nm and an apparent leveling off of the effect with increased fluence. This increasing and then leveling off is due to the depth of treatment increasing with increasing fluence. Also quite noticeable is the threshold effect wherein about 3 mJ/cm$^2$/pulse fluence is required for the onset of this increased transmission. This fluence threshold is noticed on all effects measured for this laser treatment.

TABLE 1

| Sample | Exposure (mJ/cm$^2$) | % Change in Transmission (at 550 nm) |
|---|---|---|
| A | 1 | 0 |
| B | 2 | 0 |
| C | 3 | .03 |
| D | 3 | .08 |
| E | 3 | .10 |
| F | 4 | .18 |
| G | 4 | .37 |
| H | 4 | .45 |
| I | 5 | .58 |
| J | 5 | .78 |
| K | 5 | .82 |
| L | 6 | 1.1 |
| M | 7 | 1.4 |
| N | 8 | 1.28 |
| O | 9 | 1.40 |
| P | 9 | 1.44 |
| Q | 10 | 1.38 |

Laser treatment of polymer films at these fluences does not significantly change the absorbtivity of the film at wavelengths greater than 350 nm. Therefore, increased transmission of laser treated films is a result of reduced reflectivity of the film and measurement of either effect is equivalent.

EXAMPLE 2

The example is a repeat of Example 1 with the exception that the laser gas was a mixture of Kr and F and the output wavelength was 248nm.

The data indicated that there was no change in the optical transmission until fluence exceeded 5 mJ/cm$^2$. There was an increase of transmission to a peak change of 1.5%, reached at 9 mJ/cm$^2$. The shift of the fluence threshold to a higher value of about 5 mJ/cm$^2$/pulse (as compared to Example 1) which indicates a threshold dependence on the wavelength of the radiation used to treat the surface. This occurs because PET more efficiently absorbs 193nm wavelength radiation than it does 248nm wavelength radiation.

Excimer lasers operate efficiently at four different wavelengths: 193, 248, 308, and 351nm. Efficient modification of the polymer requires that most of the Uv radiation be absorbed in the first few tenths of a micrometer of of the surface. PET intensely absorbs both 193 and 248 nm. The efficiency of the surface modification also depends on the photolytic activity of the UV. Since 193 nm is more strongly absorbed than 248 nm and has higher photolytic activity, 193 nm radiation is slightly more efficient for surface modification. The threshold for surface modification of PET by excimer laser radiation (15 nanosecond pulse width) is 3 to 4 mJ/cm$^2$/pulse for 193nm and 5 mJ/cm$^2$/pulse for 248 nm.

Excimer lasers produce roughly twice as much power at 248 nm than 193 nm. Since the threshold for surface modification at 248 nm is almost twice that of 193 nm, the net efficiency of surface modification between the two wavelengths is nearly equal. Therefore, the choice of the operating wavelength can be based on other factors.

EXAMPLE 3

Example 1 was repeated using 0.3 mm (12 mil) thick amorphous PET extrusion cast from 3M resin ER662000 obtained from 3M, St. Paul, MN. The data obtained on a Lambda 9 Spectrophotometer in the reflectance mode shows that there was no change in reflectance with up to 10 mJ/cm$^2$ fluence. This is expected since the film is completely amorphous.

EXAMPLE 4

Samples of 0.1 mm (4 ml) PET as in Example 1 were treated with one 7.5 microsecond pulse from an L-2695 flashlamp by ILC Technology, Sunnyvale, Calif., with a peak current of 1700 amperes, 25 Joules of stored energy and a lamp to sample distance of 1.0 cm. Optical transmission measurements were made on the treated sample with a Lambda 9 Spectrophotometer and showed an increase in transmission over the measurement range of 340 nm to 700 nm and at 550 nm there was a 1.5% increase. This indicates intense short pulse UV rich flashlamps are also capable of forming amorphous surface on polymers.

EXAMPLE 5

Samples of crystalline polyetheretherketone films were treated as in Example 1 at various fluences. Optical transmission of the treated samples was measured at 550 nm with a spectrophotometer as in Example 1. The data indicated a reduced reflectivity with increased fluence from 16 to 24 mJ/cm$^2$/pulse, from 14.74% reflectivity to 14.60% reflectivity.

It is well known in the literature of continuous wave, low to moderate intensity UV lamps, that surface modification of polymers is energy density insensitive. That is, if for example, 100 mJ/cm$^2$ is required to modify a polymer in a certain manner, it doesn't matter if that energy density is obtained by using an intensity of 100 milliwatts/cm$^2$ for 1 second or 50 milliwatts/cm: for 2 seconds and it has always been assumed that this was inviolate up to the energy region required for photoablation. The line indicating constant energy density of the Figure illustrates this conventional wisdom and is substantiated by experiments up to a certain fluence.

The surprising discovery of this invention is that at a certain threshold fluence, in this case 3.5 mJ/cm$^2$/pulse, there is an enormous decrease in energy density required to produce auto adhesion. The explanation of this phenomenon is believed to be that at low fluences below 3.5 mJ/cm$^2$/pulse, auto adhesion is the result of oxidation of the surface layer, whereas above the threshold fluence an amorphous surface layer is created with a lower softening temperature than the bulk polymer which results in the increased auto adhesion. It can be seen that in the region of ablation or microtexturing, the auto adhesion for this polymer is also very strong. This is another surprising discovery of this invention and is due to a reduced softening temperature of structures generated on the polymer surface.

It is apparent that amorphization can be achieved with one pulse if the fluence level is within certain ranges, and increasing the number of pulses at a particular fluence increases the depth of treatment until at too high a pulse count the polymer starts to photo degrade significantly.

EXAMPLE 6

Samples of 0.038 mm (1.5 mil.) Nylon 66 from Allied Corp., Morristown, NJ, Product ID Capran-996 were exposed to one pulse of 25 mJ/cm$^2$ as in Example 1. The samples were bonded to each other using a fiberglass covered hand sealing iron at 143° C. for 6 seconds. Untreated control samples showed no auto adhesion while the exposed samples showed good adhesion by attempting to peel them apart with a 180° hand pull. The samples were boiled in water for 15 minutes and there was little to no perceptible decrease in bond strength.

EXAMPLE 7

Samples of TCG 374-2 polyvinylchloride (PVC) film (which incorporates a polyester plasticizer) available from 3M, St. Paul, MN, was laser treated as in Example 1 to 2 pulses at fluences of 10, 20 or 30 mJ/cm$^2$/pulse.

EXAMPLE 8

A 0.1 mm biaxially oriented poly(ethylene terephthalate) film containing no slip particles was subjected to 5 pulses of radiation from an argon-fluorine excimer laser emitting at 193 nm at a fluence per pulse of 10 mJ/cm$^2$. Samples were cut from this treated film and passed rapidly through a pool of methylene chloride at 25° C., a treatment which effectively removes most of the affected surface area. Total exposure time to the CH$_2$Cl$_2$ liquid varied between 2 and 7 seconds. The solvent was allowed to flash off. Inspection of the samples indicated no visual diminution of film transparency.

The surface textures of some of these films were studied at 32,000× magnification via transmission electron microscopy of shadowed surface replicas. The surface of the laser-treated PET, prior to solvent treatment, was characterized by shallow, randomly spaced, and irregularly shaped features which measured no more than 600 Angstroms in their largest dimension. Exposure of the film to liquid methylene chloride created a more uniformly textured surface characterized by closely spaced nodular features between 150 and 600 Angstroms across. (Prior to treatment of any kind, biaxially oriented PET film was found to have a smooth but somewhat nodular texture on a size scale of about 150 to 600 Angstroms with a very small peak-to-valley ratio. Methylene chloride (liquid) treatment of this untreated surface introduced no discernible change in surface texture).

TABLE 2

| Sliding Film Surfaces | μ Static | μ Kinetic |
|---|---|---|
| Biax/Biax | >5 | >5 |
| CH₂Cl₂ Treated/CH₂Cl₂ Treated | 4.3 | 3.5 |
| Laser Treated (LT)/LT | 1.5 | 0.45 |
| LT/Biax | 1.1 | 0.43 |
| LT + CH₂Cl₂/LT + CH₂Cl₂ | 0.57 | 0.42 |
| LT + CH₂Cl₂/Biax | 0.40 | 0.45 |
| LT + CH₂Cl₂(V)*/Biax | 0.57 | 0.50 |

*Film, following laser treatement, was exposed to saturated vapor of CH₂Cl₂ at 25° C. for one hour.

EXAMPLE 9

A second, similarly made laser-treated PET was found to be essentially featureless in TEM micrographs (32,000×) of shadowed replicas. Washing in acetone created a uniformly reticulated surface having nodular rather than granular features (rounded rather than sharp) with a maximum peak-to-valley depth of about 200 Å. As with methylene chloride, acetone washing of biaxially oriented PET film produces no discernible change in its surface texture.

Coefficient of friction data for these samples are tabulated below:

| Sliding Film Surfaces | μ Static | μ Kinetic |
|---|---|---|
| Biax/Biax | >5 | >5 |
| Acetone washed Biax/Biax | >5 | >5 |
| Laser treated + acetone/Biax | 0.53 | 0.37 |

What is claimed is:

1. A process for modifying the surface of a semicrystalline polymer which process comprises irradiating at least one surface of a semicrystalline polymer composition with radiation which is absorbed by said composition, controlling the intensity and fluence of said radiation exposure such that the energy of irradiation on said at least one surface is between 3 and 25 ML/cm² with a pulsewidth between 10 nanoseconds and 100 microseconds, so that semicrystalline polymer on said surface is melted, allowing said melted polymer to cool at a rate which will form a quasi-amorphous polymeric area on said at least one surface, and then exposing said surface layer to a material which promotes crystallization within said quasi-amorphous area or exposes the underlying semicrystalline polymer.

2. The process of claim 1 wherein melting occurs to a depth of at least 5 nm and said quasi-amorphous polymeric area comprises at least 80% of said at least one surface.

3. The process of claim 1 wherein melting occurs to a depth of at least 10 nm and said polymer comprises polyethylene terephthalate.

4. The process of claim 1 wherein melting occurs over an area of at least 30 to 100% of said at least one surface.

5. The process of claim 2 wherein said radiation is selected from the group consisting of ultraviolet radiation, visible radiation and infrared radiation.

6. The process of claim 4 wherein said radiation is selected from the group consisting of ultraviolet radiation, visible radiation and infrared radiation.

7. The process of claim 5 wherein dye or pigment is present in said polymer to absorb said radiation.

8. The process of claim 6 wherein dye or pigment is present in said polymer to absorb said radiaton.

9. A process for reducing the kinetic and static coefficient of friction for a polymer surface comprising providing a polymer of poly(ethylene terephalate) having quasi-amorphous, areas on said surface, and then exposing said surface to a material chosen from the group consisting of acetone, methylene chloride, or chloroform which promotes crystallization within said areas, said crystallization causing said quasi-amorphous areas to regain their original crystallite distribution or to regain at least part of their anisotropic orientation.

10. The process of claim 9 wherein said areas are quasi-amorphous and cover at least 80% of said surface.

11. A process for modifying the surface of an oriented semicrystalline poly(ethylene terephthalate) film which process comprises first, irradiating at least one surface of said film with a pulsed ultraviolet light which is absorbed by said film, controlling the intensity and fluence of said radiation exposure such that the energy of irradiation on said at least one surface is between 3 and 25 mJ/cm² with a pulsewidth between 10 nanoseoonds and 100 microseconds, so that a thin surface layer of said film is converted to a quasi-amorphous state which persists on rapid cooling to ambient temperature and, second, exposing said surface layer to a penetrant which is effective in inducing the crystallization of normal amorphous poly(ethylene terephthalate) at 25° C.

* * * * *

UNITED STATES PATENT AND TRADEMARK OFFICE
CERTIFICATE OF CORRECTION

PATENT NO. : 4,868,006

DATED : September 19, 1989

INVENTOR(S) : Yorkgitis, Smith, Ouderkirk and Dunn

It is certified that error appears in the above-identified patent and that said Letters Patent is hereby corrected as shown below:

Column 10, line 42, "confirmations" should be --conformations--.

Column 11, line 8, "very" should be --over--.

Column 11, line 15, "confirmation" should be --conformation--.

Column 16, line 13, "speotroscopy" should be --spectroscopy--.

Column 16, line 15, "gauohe-conformer" should be --gauche-conformer--.

Column 16, line 54, "penetant" should be --penetrant--.

Column 21, line 63, "50 milliwatts/cm:" should be --50 milliwatts/cm$^2$--.

Signed and Sealed this

Tenth Day of December, 1991

Attest:

HARRY F. MANBECK, JR.

Attesting Officer

Commissioner of Patents and Trademarks